United States Patent
Nishikawa

(10) Patent No.: US 6,192,298 B1
(45) Date of Patent: Feb. 20, 2001

(54) METHOD OF CORRECTING SHIFT OF WORKING POSITION IN ROBOT MANIPULATION SYSTEM

(75) Inventor: Yoshifumi Nishikawa, Osaka (JP)

(73) Assignee: Matsushita Electric Industrial Co., Ltd., Osaka-fu (JP)

( * ) Notice: Under 35 U.S.C. 154(b), the term of this patent shall be extended for 0 days.

(21) Appl. No.: 09/085,019

(22) Filed: May 28, 1998

(30) Foreign Application Priority Data

May 30, 1997 (JP) .................................................. 9-141951

(51) Int. Cl.[7] .................................................. G05B 19/18
(52) U.S. Cl. .................. 700/251; 700/254; 901/42; 318/568.16
(58) Field of Search .................. 700/254, 253, 700/245, 250, 114, 251; 702/95; 318/568.19, 568.16; 901/9, 10, 42

(56) References Cited

U.S. PATENT DOCUMENTS

| | | | | |
|---|---|---|---|---|
| 4,014,495 | * | 3/1977 | Oda et al. | 228/7 |
| 4,229,641 | * | 10/1980 | Ihara | 219/125.1 |
| 4,448,342 | * | 5/1984 | Abe et al. | 228/102 |
| 4,629,860 | * | 12/1986 | Lindbom | 219/125.1 |
| 4,700,118 | * | 10/1987 | Kishi et al. | 318/568.19 |
| 4,706,000 | * | 11/1987 | Kishi et al. | 318/568.19 |
| 4,794,547 | * | 12/1988 | Nishida | 700/262 |
| 4,816,733 | * | 3/1989 | Sakakibara et al. | 318/568.22 |
| 4,899,095 | * | 2/1990 | Kishi et al. | 700/262 |
| 5,911,892 | * | 6/1999 | Kosaka et al. | 129/125.1 |
| 5,929,584 | * | 7/1999 | Bunnarsson et al. | 318/568.16 |
| 5,932,122 | * | 8/1999 | Hong | 219/124.34 |

FOREIGN PATENT DOCUMENTS 1257593   10/1989   (JP) .

OTHER PUBLICATIONS

An English Language abstract of JP 1–257593.

* cited by examiner

Primary Examiner—Paul P. Gordon
Assistant Examiner—Edward F. Gain, Jr.
(74) Attorney, Agent, or Firm—Greenblum & Bernstein, P.L.C.

(57) ABSTRACT

In a shift correcting method of correcting a shift of a tool working position in a robot manipulation system, a working tool (7) is rotated around a tool longitudinal axis (m) as a rotating center axis on a tool coordinate system to change a posture of the working tool, and the working tool is moved in one direction toward a specified part of a contact detecting member (21) to be brought into contact therewith to detect a contact and the data of the detected contact position is stored to obtain a difference as a shift amount between the actual tool working position and a theoretical tool working position.

6 Claims, 4 Drawing Sheets

METHOD OF CORRECTING SHIFT OF WORKING POSITION IN ROBOT MANIPULATION SYSTEM

BACKGROUND OF THE INVENTION

1. Field of the Invention

The present invention generally relates to a correcting method, and in particular to a method of correcting a shift of a working position of a working tool for use in a robot manipulation system.

2. Description of the Prior Art

In a conventional method of correcting a shift in positioning of a working tool in a robot manipulation system, there has been suggested a method of correcting a shift of bead in alignment in the disclosure of e.g. Japanese Paten Laid Open Unexamined Publication 1-257593.

In this robot mechanical arrangement, the following briefly describes an example of a conventional correcting method for correcting a shift of a position of a working tool for a robot manipulator system. In the conventional method, as shown in FIGS. 5 and 6, in order to adjust a working point of a working tool of a robot, a contact piece member provided on the working tool is brought into contact with a specified jig. Then, an error between the working point of the working tool and a reference working point determined in control programming of the robot is calculated for use as an offset amount according to data of the contact positions, thereby eliminating troublesome problems in calculating the offset amount.

In the method as shown in FIGS. 5 and 6, it is noted that, in the case where a subject work for a robot is a welding operation, a welding torch 58 is used as a working tool which is fitted to the robot main body. A welding wire 58b serving as a kind of contact piece is provided on the welding torch 58 and a tip portion 58a of the welding wire is brought into contact with a specified jig 59. The jig 59 has three conductive plates (59a, 59b, 59c) installed generally in a three-dimensional relationship to each other within the operating range of the robot, so that the tip 58a of the welding wire is moved in three dimensional directions P0–P1, P0–P2, and P0–P3 to be brought into contact with each of the three conductive plates 59a through 59c.

The position data at a timing of detecting the contact between the tip 58a of the welding wire 58b and each of the three conductive plates of the jig 59 is stored in a storage portion of a robot controller 60. The detection of the contact is electrically performed by applying a voltage between the welding torch 58 and the jig 59 by a voltage applying unit (not shown). Then, a difference between the position data of the preceding contact position and the position data of the present contact position is calculated by an arithmetic method to thereby compute an error between the position of the tip 58a of the welding wire and the reference point determined in control programming of the robot. The obtained error is stored as an offset amount, and the position of the welding torch 58 is shifted in a direction of absorbing the offset amount. Thus, the tip position of the welding wire is aligned with the reference point determined in control programming of the robot to thereby correct a shift of bead caused in a welding work and the like.

In this conventional method, there has been employed a step of detecting an electrical contact between the contact piece of the welding torch and the three jig plates in three dimensional directions different from each other. However, in the conventional methods, there has been a problematic case such that a working tool per se can not be directly used as a contact piece member, for example, in the case where a non-conductive or electrically insulating member is used as a working tool in the robot manipulation for such as laser sealing, bonding material and the like.

In such a problematic case, it is necessary to further provided an additional detecting unit for detecting an electrical contact such as e.g. a limit switch which detects an electrical contact when a working tool is moved to a predetermined position. Since the detection of the electrical contact with the three conductive plates must be carried out in the three different directions in the conventional method, therefore three contact detecting units are further required for detecting the contacts with the three conductive plates, respectively, which increases the cost of the robot system, undesirably making the construction thereof more complex.

SUMMARY OF THE INVENTION

The present invention has been developed with a view to substantially solving the above described disadvantages. Accordingly, an essential objective of the present invention is therefore to provide a noble correcting method for correcting a shift of bead to adjust a working point of a working tool in a robot control system with a low cost and simple construction.

In order to achieve the above objective, according to as aspect of the present invention, a shift correcting method of correcting a shift of a tool working position in a robot manipulation system, comprises the steps of:

rotating a working tool around a tool longitudinal axis as a rotating center axis on a tool coordinate system to change a posture of the tool;

moving the working tool in one direction toward a specified part of a contact detecting member to be brought into contact therewith to detect a contact between the working tool and the contact detecting member;

storing data of the detected contact positions;

calculating an actual tool working position from the stored position data to obtain a difference as a shift amount between the actual tool working position and a theoretical tool working position previously obtained by a robot control program; and storing the calculated shift amount for use as a correcting amount for correcting a shift in the following robot manipulating operation.

The method further comprises the steps of repeating the entire steps as recited above in common before and after a shift of the tool working position is caused to thereby obtain the difference between the calculated shift amounts before and after the shift is caused, wherein the obtained difference is used as a practical correcting amount in the following robot manipulating operation.

By the method of the present invention, by repeating the rotating operations around the tool longitudinal axis on the tool coordinate system together with executing the contact sensing operations in one direction toward the contact face of the contact detecting unit, the practical correcting amount can be obtained for correcting the relative shift amount between the tool working positions before and after subject to a shift. Thus, the mechanical construction of the robot manipulator system can be remarkably simplified with a lower cost.

BRIEF DESCRIPTION OF THE DRAWINGS

These and other objects and features of the present invention will become clear from the following description taken in conjunction with the preferred embodiments thereof with reference to the accompanying drawings, in which.

DETAILED DESCRIPTION OF THE PREFERRED EMBODIMENT

Figure 1:
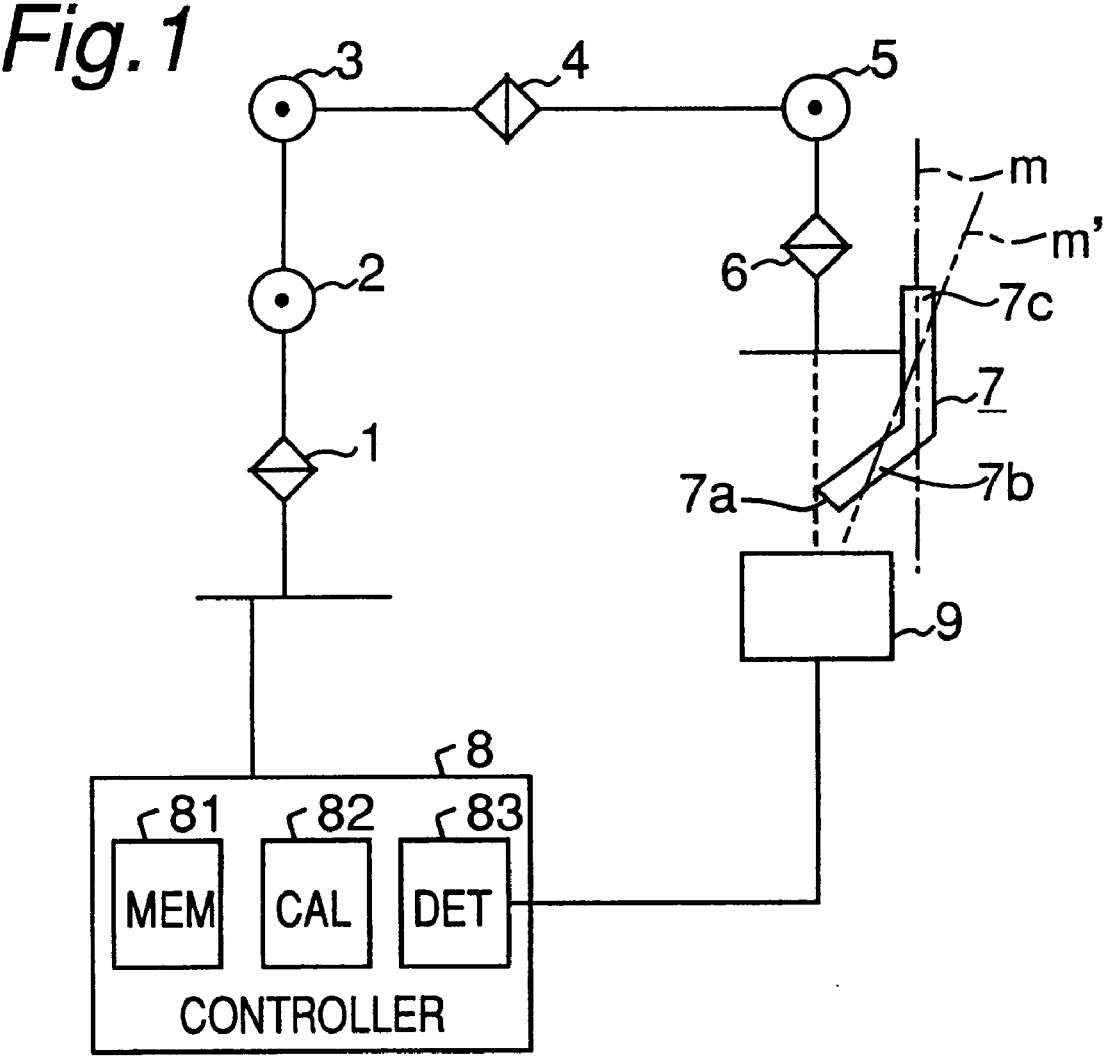
FIG. 1 is a schematic view showing a construction of a robot manipulator system according to an embodiment of the present invention.

Before the description proceeds, it is noted that, since the basic structure of the preferred embodiment is similar to that of the conventional one, like parts are designated by the same reference numerals throughout the accompanying drawings.

The following briefly describes a typical industrial robot having a robot arm in which six degrees of freedom of movement, exclusive of gripper closure, are required to enable a gripper or working tool to approach an object from any orientation. In the meanwhile, powering of robot's joints is made by mechanical articulations, designing backlash-free mechanical linkages which can transmit power effectively through the articulations of the arm in all of its positions using a robot control system.

The robot control system electronically directs activities of mechanical parts of the robot. This may include a sequencing device and a set of mechanical stops, so that the mechanism moves in a repetitive pattern between selected positions. Alternatively, the robot system may employ servo-controlled positioning of the joints, and a measure of an actual joint position is obtained from a transducer such as an optical shaft encoder, and is compared with a position specified for the joint. If a desired position and a measured position differ from each other, a correcting drive signal is applied to a joint drive unit (not shown) by a robot controller.

The control system generates a robot's trajectory automatically by computer. Such computations may be based on mathematical descriptions of work objects or tasks contained in the computer's data base. The computer may also generate trajectories for the robot per se which are not fixed but varied with the state of the external environment as taken by a robot's sensor system. Each level of control stages accepts a statement of a goal to be achieved. Higher levels attempt to achieve their current goal by issuing sequences of commands (subgoals) to their subordinate levels. Specific information needed by the control system is gathered to maintain an internal, predictive model of the environment. Visual, proximity, tactile, acoustic, and force or torque sensing means may be all used. Commonly used means of sensing objects at a distance is some form of tactile or visual sense, which is usually done by computer analysis.

In such a robot mechanical arrangement as mentioned above, a preferred embodiment of the present invention is described below with reference to FIGS. 1 through 4.

FIG. 1 shows a schematic construction of a robot manipulator system employing a preferred correcting method for correcting a shift of a position of a working tool.

In FIG. 1, a robot manipulator system is comprised of a robot main body including a robot arm, and a working tool 7 which is securely fitted to a gripper-like member of the robot arm. The robot main body includes six joints 1 through 6 for providing six degrees of freedom of movement of the robot arm to effectively transmit power of the joints through articulations of the arm in all positions, which the mechanical arrangement enables the working tool to approach a work object from any orientation.

The working tool 7 has a vertically extending portion 7c and a contact piece member 7b extending in a slanted state from the vertical portion 7c in this figure. However, the posture of "vertically" extending is merely an example of the working tool and other inclined posture may be used. In this embodiment, the longitudinal center axis of the vertical portion 7c is referred to as "tool longitudinal axis" hereinafter, which is designated by a one-dotted line m. However, it is noted here that other inclined axis such as designated by line m' may be also used in other posture of the robot main body.

The robot manipulator includes a system controller 8 for controlling activities of the main body and further includes a contact detector unit 9 for detecting a contact between the working tool 7 and a specified part of the contact detector unit 9 by e.g. an electrically detecting method. For example, when a tip portion 7a of the contact piece member 7b of the working tool 7 is brought into contact with a specified part of the contact detector unit 9, this contact is detected by an electrically detecting method using e.g. an electrically conductive member or the like as the specified part, and then the contact detector unit 9 transmits a contact detection signal to a contact detecting portion 83 of the system controller 8 to store data of the contact tool tip position in a storage portion 81 via a calculating portion 82 in the system controller 8.

Figure 2:
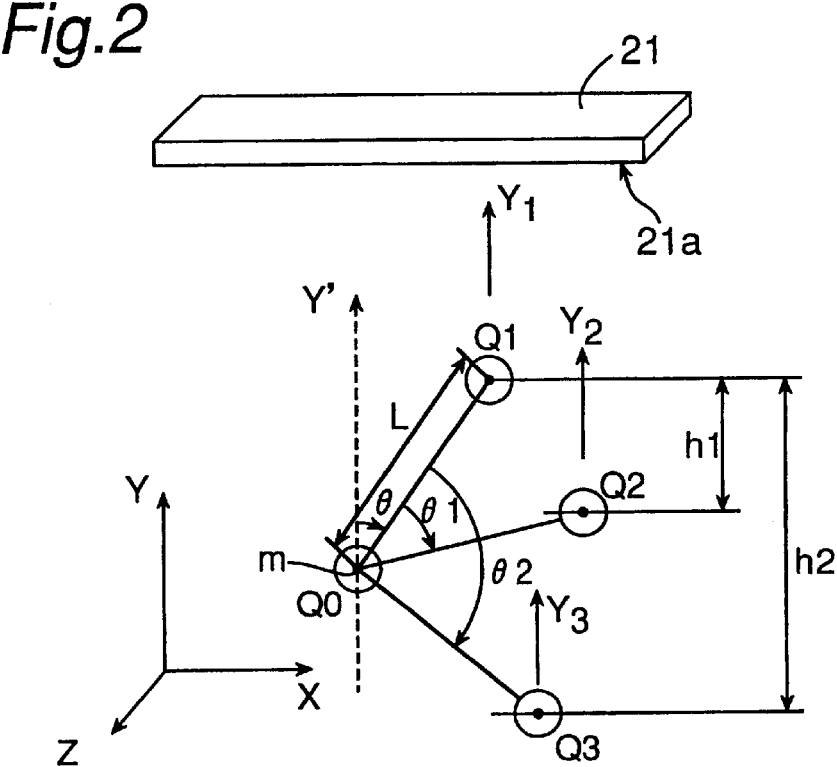
FIG. 2 is an explanatory view showing a procedure of obtaining a correcting amount relative to a reference control position according to the present embodiment.

FIG. 2 shows a positioning relationship between the contact detector unit 9 and the working tool 7 for obtaining a correcting amount of an actual tool tip position relative to a theoretical tool tip position in common before and after subject to shift in position. The theoretical tool tip position is referred to a control reference point previously obtained in control programming of a robot. In FIG. 2, the contact detector unit 9 has a single contact detecting plate 21 which is comprised of e.g. an electrically conductive member having a flat contact face 21a which is to be brought into contact with the tip portion 7a of the working tool 7. In this arrangement, the contact detecting plate 21 is located within the operating range of the robot with the contact face 21a thereof being oriented in a state parallel to an XZ plane defined by X and Z axes of a robot coordinate system (X, Y and Z axes coordinate basis).

Figure 3:
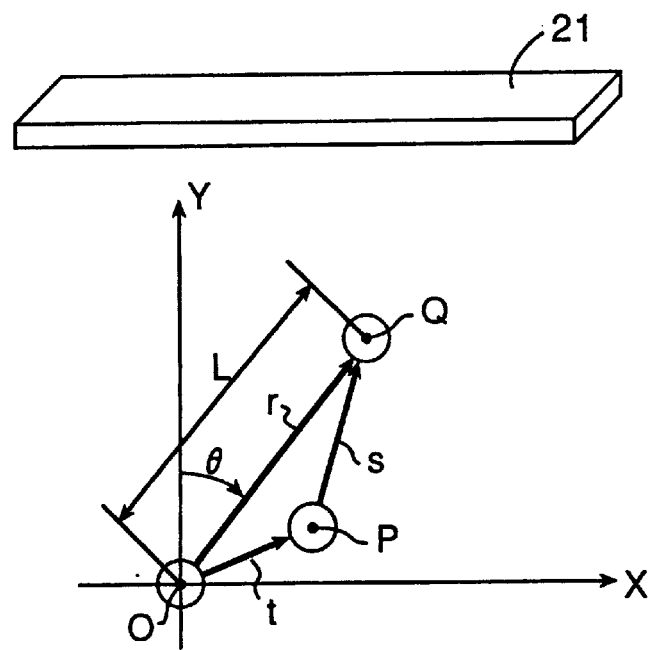
FIG. 3 is an explanatory view showing a procedure of obtaining a correcting amount of an actual working position relative to an original working position.

In operating the robot manipulator, the following describes the case where the working tool 7 contacts or comes into collision with a jig member or a work object and the position of the tool tip portion 7a is shifted from an original state as shown in FIG. 3. When a positional shift is caused, execution command of calculating a correction amount for the shift is applied to the calculating portion 82 of the robot controller for correcting the shift of the working position. The operation of calculating the correction amount is described in more detail below with reference to FIGS. 2 through 4.

Figure 4:
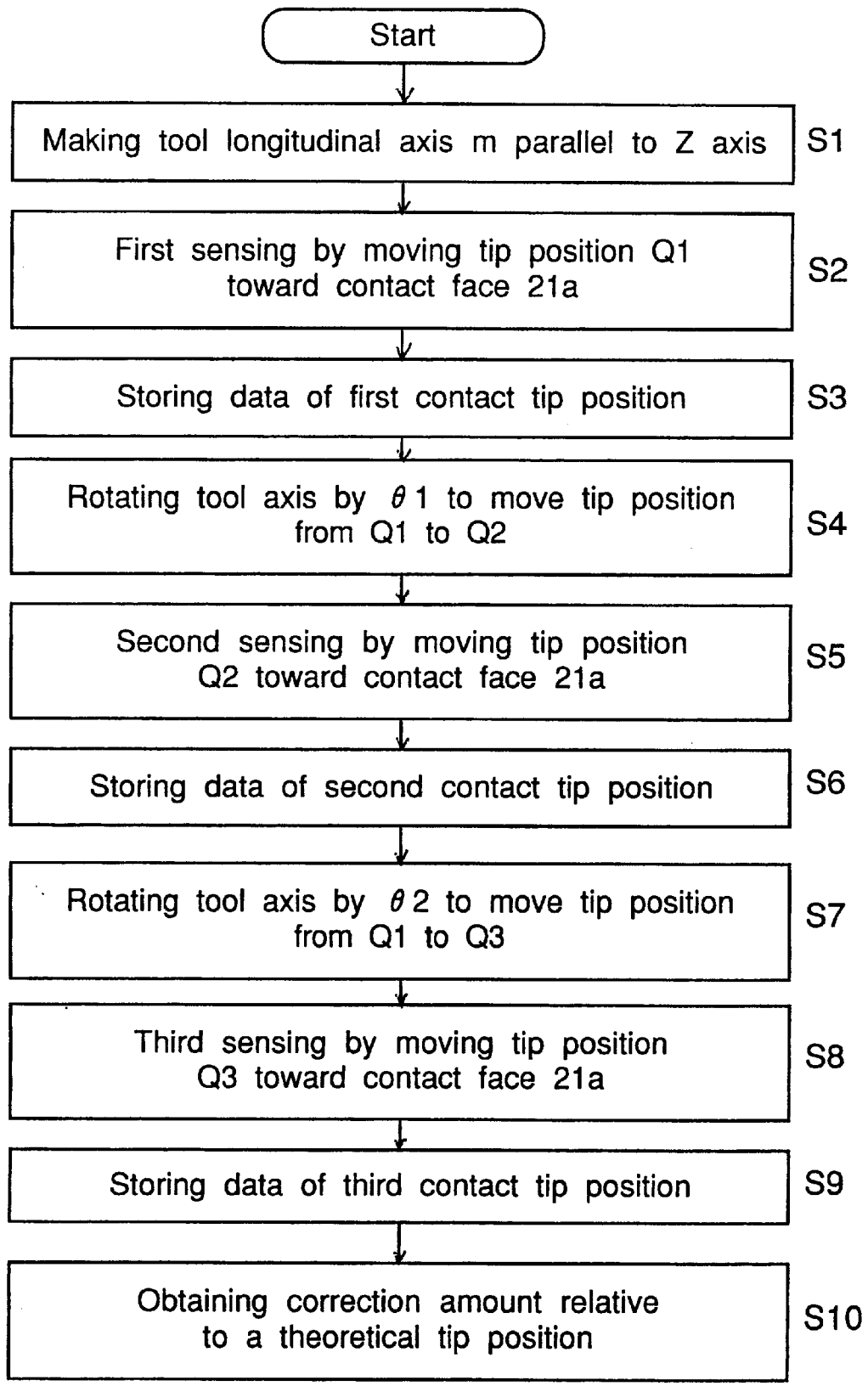
FIG. 4 is a flow chart explaining an operation of obtaining the correcting amount shown in FIG. 2.
Figure 5:
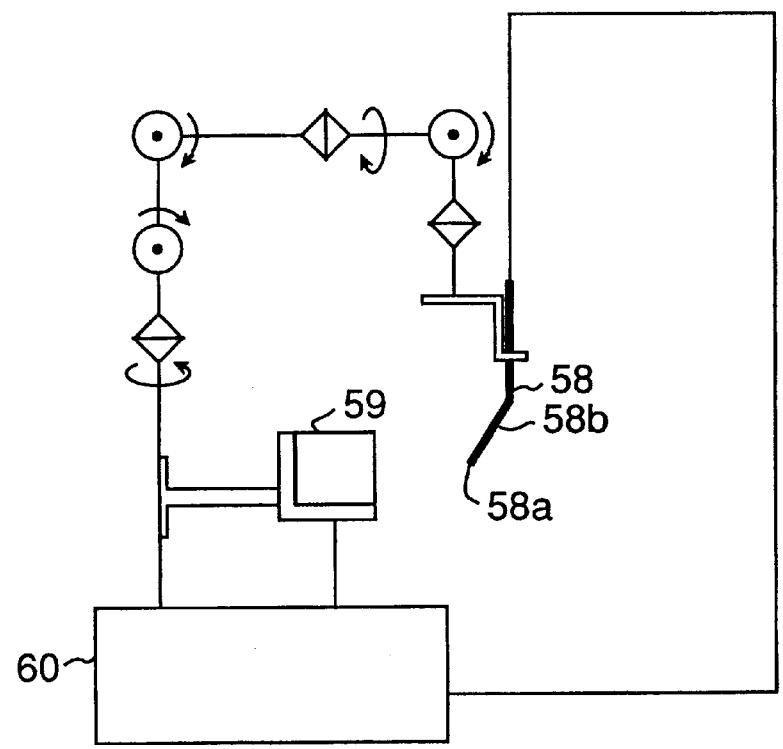
FIG. 5 is a schematic view showing a conventional construction of a robot manipulator system.
Figure 6:
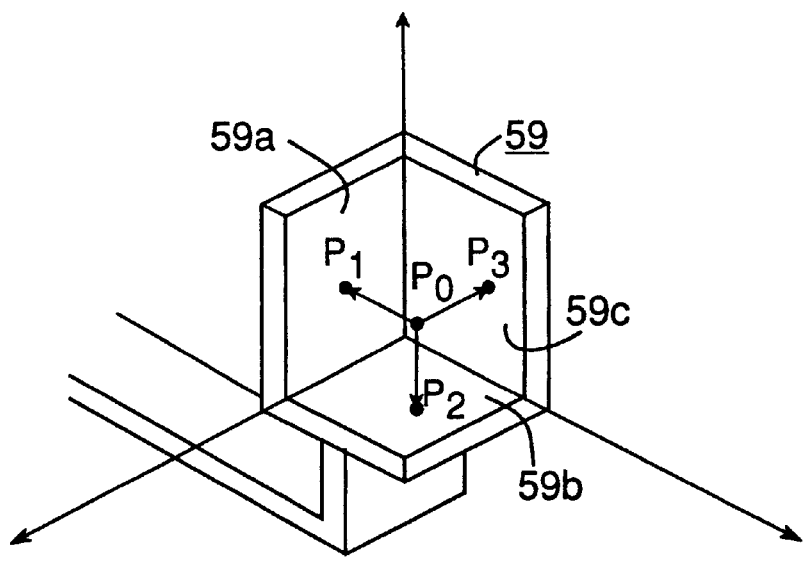
FIG. 6 is a schematic view showing a conventional positioning relationship between a tool tip position and three jig plates.

Initially, in step S1 of the flow chart shown in FIG. 4, the drive of the robot arm is so controlled for the posture of the working tool 7 to have its tool longitudinal axis m being parallel to Z axis of the robot coordinate basis. At this stage, an actual tip position of the tip portion 7a of the working tool 7 is designated by point Q1 in FIG. 2 while the theoretical tip position of the working tool 7 is designated by Q0 which is a control reference point previously calculated in a robot control program by a computation of the system controller 8.

Next, in step S2, the tip portion 7a of the working tool 7 is moved from the first position Q1 toward the contact face 21a of the contact detection plate 21 to be brought into contact therewith in a direction shown by an arrow Y1, maintaining the same posture of the working tool 7 as that in the step S1, where the movement direction Y1 is parallel to Y axis of the robot coordinate and is generally perpendicular to the contact face 21a and the process of step S2 is referred to as "first sensing operation".

When the tip portion 7a is brought into contact with the contact face 21a, the tool tip position data at this first contact point in the robot coordinate basis is stored in the storage portion 81 in the system controller 8 in step S3, which the position data is assumed to be "a".

Next, in step S4, the working tool 7 is rotated in a clockwise direction by an angle 81 around the tool longitudinal axis m as the rotating axis and the tool tip position Q1 is moved to a second position Q2. Then, in step S5, the tip portion of the working tool 7 is moved from the second position Q2 toward the contact face 21a of the contact detecting plate 21 to be brought into contact therewith in a direction Y2 perpendicular to the contact face 21a, maintaining the same posture of the working tool 7, which the process of step S5 is referred to as "second sensing operation" similar to the first sensing operation of step S2.

When the tip portion 7a is brought into contact with the contact face 21a, the tool tip position data at this second contact point in the robot coordinate basis is stored in the storage portion 81 in the system controller 8 in step S6, which the position data is assumed to be "b".

Next, in step S7, the working tool 7 is rotated in a clockwise direction by an angle θ2 from the position Q1 around the tool longitudinal axis m as the rotating axis and the tool tip portion is moved to a third position Q3 different from the second position Q2. Then, in step S8, the tip portion of the working tool 7 is moved from the third position Q3 toward the contact face 21a of the contact detecting plate 21 to be brought into contact therewith in a direction Y3 perpendicular to the contact face 21a, maintaining the same posture of the working tool 7, which the process of step S8 is referred to as "third sensing operation" similarly.

When the tip portion 7a is brought into contact with the contact face 21a, the tool tip position data of at the third contact point in the robot coordinate basis is stored in the storage portion in the system controller 8 in step S9, which the position data is assumed to be "c". Then, in step S10, the target correcting amount of the actual tool tip position relative to the theoretical tool tip position in calculated using the above stored position data a, b and c, which the calculated resultant value of the target correcting amount is stored as an actual-to-theoretical relative correcting amount for use in the following shift correcting operation.

FIG. 3 shows a positional relationship in a tool coordinate system between an actual tool tip position P before subject to a shift in position and an actual tool tip position Q after subject to a shift in position of the tool tip portion with respect to the theoretical tool tip position O previously obtained by a robot control program. It is noted here that the term "tool coordinate system" is referred to a coordinate basis in which the tool longitudinal axis is coincident with the Z axis of the robot coordinate basis.

In FIG. 3, it is assumed that the distance between the theoretical tool tip position O and the actual tool tip position Q after subject to a shift is L and that the rotation angle of the vector OQ (i.e., r) around the tool longitudinal axis m passing through the origin point O as the rotation center axis is θ with respect to the vertical axis Y which is perpendicular to the contact face 21a. In this relationship, the tool longitudinal axis is made coincident with the Z axis and is omitted here for brevity.

Referring back to FIG. 2, in the tool coordinate basis, the tool tip positions Q1, Q2 and Q3 shown in the robot coordinate basis are respectively represented by numeral functions below:

$$Q1\ (x,\ y) = f\ (L,\ \theta) \tag{1}$$

$$Q2\ (x,\ y) = f\ (L,\ \theta,\ \theta 1) \tag{2}$$

$$Q3\ (x,\ y) = f\ (L,\ \theta,\ \theta 2) \tag{3}$$

In this state, when the difference in the Y axis direction between the first and second positions (Q1 and Q2) is h1 and the difference in the Y axis direction between the first and third positions (Q1 and Q3) is h2, h1 and h2 are respectively represented by equations (4) and (5) in view of the above equations (1) to (3):

$$h1 = g\ (L,\ \theta,\ \theta 1) \tag{4}$$

$$h2 = g\ (L,\ \theta,\ \theta 2) \tag{5}$$

By introducing the stored values a, b and c obtained in the first, second and third sensing operations into the above equations (4) and (5), h1 and h2 are represented by equations (6) and (7) as below:

$$h1 = k\ (a,\ b) \tag{6}$$

$$h2 = k\ (a,\ c) \tag{7}$$

By executing the first to third sensing operations of the tip position detecting processing flow, the factors h1, h2 and θ1, θ2 are known values. Therefore, by introducing these values h1, h2 and θ1, θ2 into equations (4) and (5), the factors L and θ are obtained. The obtained values L and θ are stored in the storage portion 81 of the system controller 8 for use as the correcting amount in the tool coordinate basis in step S10 of the processing flow shown in FIG. 4.

In the case where the robot manipulator is driven in accordance with a predetermined program previously instructed by an operator, the instructed points are corrected by the correcting amount stored in the storage portion mentioned above. However, the above obtained correcting amount is for correcting a shift of an actual tool tip position relative to the theoretical tool tip position and is different from an actual correcting amount for practical use.

In FIG. 3, the practical correcting amount is represented by a vector PQ (i.e., s) which is a relative difference between the original tool tip position P before subject to a shift and the actual tool tip position Q after subject to a shift. Therefore, in order to obtain the practical correcting amount of the relative difference s, the shifting amount t (i.e., vector OP) between the theoretical tip position O and the original tip position P is previously calculated by the same procedure shown in FIGS. 2 and 4. Thus, when a shift of a tool tip position is caused to shift the actual tip position from point P to Q, the practical correcting amount s is obtained by calculating the subtraction between the vectors OQ and OP, i.e., a=r−t.

As described above, in the preferred embodiment of the present invention, by repeating the rotating operations around the tool longitudinal axis on the tool coordinate system together with executing the first to third sensing operations in one direction generally perpendicular toward the contact face of the contact detecting unit, the practical correcting amount can be obtained for correcting the relative shift amount between the tool working positions before and after subject to a shift. Thus, the mechanical construction of the robot manipulator system can be remarkably simplified with a reduced cost.

As apparent for the above description, by achieving a shift correcting method of the present invention, the correcting amount can be obtained by sensing operations in a single direction, and a simple mechanical construction of a robot manipulator system can be attained with a low cost.

What is claimed is:

1. A method of correcting a shift of a position of a working tool in a robot manipulation system, comprising:

moving the working tool in one direction from a first position toward a contact detecting member until the working tool abuts the contact detecting member to detect a first contact position where the working tool contacts the contact detecting member;

rotating the working tool around a tool longitudinal axis serving as a rotational axis on a robot coordinate system by a predetermined angle to change a posture of the working tool to a second position;

moving the working tool in the one direction from the second position toward the contact detecting member until the working tool abuts the contact detecting member to detect a second contact position where the working tool contacts the contact detecting member;

calculating the first position based on the first and second contact positions and the predetermined angle;

obtaining a difference as a shift amount between the first position and a theoretical tool working position which is previously obtained as a control reference point by a robot control program; and storing the obtained shift amount to correct a position of the working tool in a subsequent robot manipulating operation.

2. The method as claimed in claim 1, wherein the posture of the working tool has the tool longitudinal axis being parallel to Z axis of the robot coordinate system.

3. The method as claimed in claim 1, wherein said one direction of the working tool is generally perpendicular to a contact face of the contact detecting member.

4. The method according to claim 1, further comprising:

rotating the working tool around the tool longitudinal axis with a second predetermined angle from the first position to change a posture of the working tool to a third position, which is different from the second position; and moving the working tool in the one direction from the third position toward the contact detecting member until the working tool abuts the contact detecting member to detect a third position where the working tool contacts the contact detecting member;

wherein the calculating calculates the first position based on the third contact position and the second predetermined angle in addition to the first and second contact positions and the predetermined angle.

5. The method according to claim 1, wherein the moving of the working tool in the one direction from the first position, the rotation of the working tool and the moving of the working tool in the one direction from the second position occurs without intervening movement in other directions.

6. The method according to claim 1, wherein the contact detecting member is a planar member with a single planar contact surface.

* * * * *